United States Patent
Van Der Zee et al.

(10) Patent No.: US 10,781,834 B2
(45) Date of Patent: Sep. 22, 2020

(54) METHOD AND SYSTEM FOR TRANSPORTING AND STORING AT LEAST TWO WIND TURBINE BLADES

(71) Applicant: LM WP PATENT HOLDING A/S, Kolding (DK)

(72) Inventors: Jacobus Van Der Zee, Kolding (DK); Anders Nielsen, Daugaard (DK); Kenth Skipper-Mortensen, Horsens (DK)

(73) Assignee: LM WP PATENT HOLDING A/S, Kolding (DK)

( * ) Notice: Subject to any disclaimer, the term of this patent is extended or adjusted under 35 U.S.C. 154(b) by 119 days.

(21) Appl. No.: 15/184,172

(22) Filed: Jun. 16, 2016

(65) Prior Publication Data
US 2016/0369768 A1 Dec. 22, 2016

Related U.S. Application Data

(63) Continuation of application No. 14/437,649, filed as application No. PCT/EP2013/072386 on Oct. 25, 2013, now Pat. No. 9,874,235.

(30) Foreign Application Priority Data

Oct. 26, 2012 (GB) .................................. 1219279.5
Nov. 8, 2012 (GB) .................................... 1220100

(51) Int. Cl.
  *F16B 2/08* (2006.01)
  *F03D 13/40* (2016.01)
  *A47B 47/00* (2006.01)

(52) U.S. Cl.
  CPC ............ *F16B 2/08* (2013.01); *A47B 47/0091* (2013.01); *F03D 13/40* (2016.05);
(Continued)

(58) Field of Classification Search
  CPC .. F03D 13/40; A47B 47/0091; F05B 2240/30; F05B 2260/02; F16B 2/08
  See application file for complete search history.

(56) References Cited

U.S. PATENT DOCUMENTS

| | | | | |
|---|---|---|---|---|
| 6,983,844 B2 * | 1/2006 | O'Kane | ................ | B65D 85/68 206/319 |
| 7,591,621 B1 * | 9/2009 | Landrum | ................ | B60P 3/40 410/44 |

(Continued)

FOREIGN PATENT DOCUMENTS

| CN | 101259897 A | 9/2008 |
|---|---|---|
| CN | 201446907 U | 5/2010 |

(Continued)

OTHER PUBLICATIONS

Search Report issued in British Application No. GB1220100.0 dated Mar. 6, 2013 (dated Mar. 6, 2013).

(Continued)

*Primary Examiner* — Stanton L Krycinski
(74) *Attorney, Agent, or Firm* — Nath, Goldberg & Meyer; Jerald L. Meyer; Tanya E. Harkins

(57) ABSTRACT

A transportation and storage system for at least two wind turbine blades include a first wind turbine blade and a second wind turbine blade is described. The wind turbine blades each have a root end and a tip end. The system includes a packaging system adapted to place the first wind turbine blade so that the tip end of the first wind turbine blade points in a first direction, with the tip end of the second wind turbine blade pointing in a second direction, which is substantially opposite to the first direction. The tip end of the second wind turbine blade extends beyond the root end of the first wind turbine blade, and the tip end of the first wind turbine blade extends beyond the root end of the second (Continued)

Figure 1:
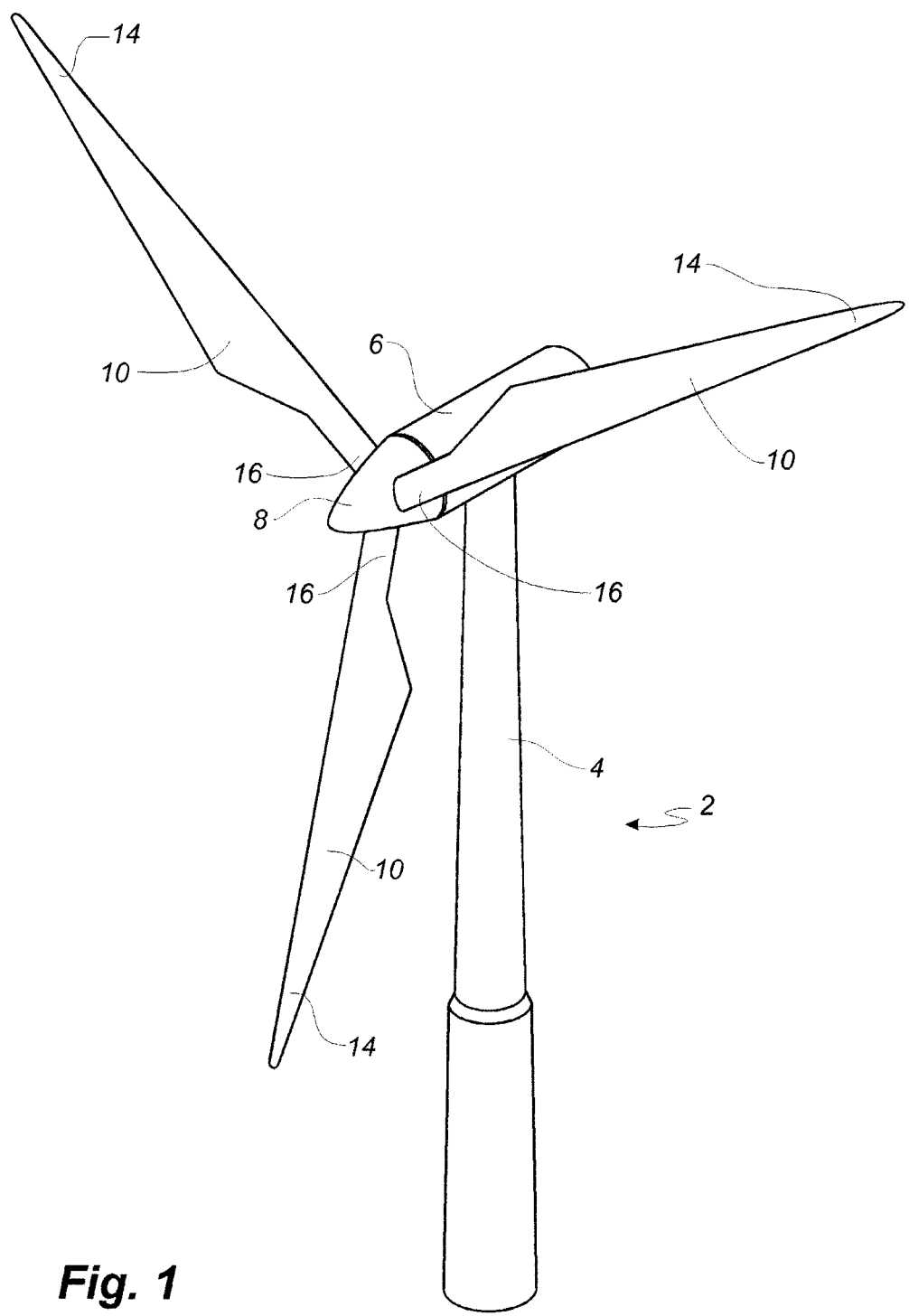

wind turbine blade, when the first and the second wind turbine blades are arranged in the packaging system.

13 Claims, 9 Drawing Sheets

(52) U.S. Cl.
CPC ....... *F05B 2240/30* (2013.01); *F05B 2260/02* (2013.01); *Y02E 10/721* (2013.01)

(56) References Cited

U.S. PATENT DOCUMENTS

| | | | | |
|---|---|---|---|---|
| 7,690,875 B2* | 4/2010 | Grabau | ................... | B60P 3/40 410/34 |
| 7,704,024 B2* | 4/2010 | Kootstra | ................ | B60P 3/40 410/44 |
| 7,967,536 B2* | 6/2011 | Broderick | ............... | B60P 3/40 410/120 |
| 8,056,203 B2* | 11/2011 | Madsen | .................. | B60P 3/40 29/407.09 |
| 8,177,462 B2* | 5/2012 | Riddell | ................... | B60P 3/40 410/31 |
| 8,240,962 B2* | 8/2012 | Livingston | ............ | F03D 1/0675 410/120 |
| 8,313,272 B2* | 11/2012 | Koike | .................. | F03D 13/40 410/44 |
| 8,342,491 B2* | 1/2013 | Jorgensen | ............... | F03D 13/40 269/17 |
| 8,511,921 B2* | 8/2013 | Riddell | ................... | B60P 3/40 401/44 |
| 8,562,302 B2* | 10/2013 | Bakhuis | .................. | B60P 3/40 269/37 |
| 8,602,700 B2* | 12/2013 | Johnson | ................. | F03D 13/40 410/44 |
| 8,622,670 B2* | 1/2014 | Vitor | ..................... | B65D 61/00 410/120 |
| 8,632,286 B2* | 1/2014 | Wessel | .................. | F03D 80/00 410/35 |
| 8,672,131 B2* | 3/2014 | Nogueira | .............. | B65D 85/68 206/521 |
| 8,753,050 B2* | 6/2014 | Cyrus | ..................... | B60P 3/40 410/120 |
| 8,967,929 B2* | 3/2015 | Frederiksen | .............. | B60P 3/40 410/44 |
| 9,086,052 B2* | 7/2015 | Hiremath | ................ | F03D 1/005 |
| 9,199,570 B2* | 12/2015 | Pedersen | ................... | B60P 3/40 |
| 9,260,875 B2* | 2/2016 | Bjoernskov | ............ | E04H 12/08 |
| 9,347,426 B2* | 5/2016 | Landrum | ................ | F03D 1/005 |
| 9,434,291 B2* | 9/2016 | Kelly | ...................... | B60P 3/40 |
| 9,494,140 B2* | 11/2016 | Sigurdsson | ............ | A47B 81/00 |
| 2006/0251517 A1* | 11/2006 | Grabau | .................... | B60P 3/40 416/202 |
| 2007/0177954 A1* | 8/2007 | Kootstra | .................. | B60P 3/40 410/44 |
| 2007/0189895 A1* | 8/2007 | Kootstra | .................. | B60P 3/40 416/9 |
| 2007/0253829 A1* | 11/2007 | Wessel | .................. | F03D 80/00 416/244 R |
| 2009/0003957 A1* | 1/2009 | Llorente Gonzalez | ..................... | B65D 85/68 410/35 |
| 2009/0020445 A1* | 1/2009 | Koike | ................. | H01M 8/0252 206/319 |
| 2009/0169323 A1* | 7/2009 | Livingston | ............ | F03D 1/0675 410/120 |
| 2010/0252977 A1* | 10/2010 | Jorgensen | ............... | F03D 13/40 269/287 |
| 2011/0142660 A1* | 6/2011 | Bakhuis | .................... | B60P 3/40 416/223 R |
| 2011/0308205 A1* | 12/2011 | Vitor | ..................... | B65D 61/00 53/475 |
| 2012/0124833 A1* | 5/2012 | Arendt | .................... | F03D 13/10 29/889.7 |
| 2012/0192420 A1* | 8/2012 | Krogh | ..................... | F03D 1/005 29/889 |
| 2013/0119002 A1* | 5/2013 | Frederiksen | ............. | B60P 3/40 211/60.1 |
| 2013/0121780 A1* | 5/2013 | Ressel | ..................... | B60P 3/40 410/44 |
| 2013/0216325 A1* | 8/2013 | Johnson | .................. | F03D 13/40 410/44 |
| 2013/0319891 A1* | 12/2013 | Lieberknecht | ......... | B65D 85/68 206/448 |
| 2014/0193255 A1* | 7/2014 | Hancock | ................ | F03D 7/022 416/1 |
| 2014/0305743 A1* | 10/2014 | Poulsen | ............... | B65G 1/0442 187/244 |
| 2014/0314576 A1* | 10/2014 | Lieberknecht | ............ | F01D 5/32 416/220 R |
| 2014/0353266 A1* | 12/2014 | Frederiksen | .............. | B60P 3/40 211/60.1 |
| 2015/0192104 A1* | 7/2015 | Lulker | .................... | F03D 13/40 206/493 |
| 2015/0198140 A1* | 7/2015 | Sigurdsson | ............ | A47B 81/00 211/60.1 |
| 2015/0369209 A1* | 12/2015 | Datta | ........................ | B60P 3/40 211/85.8 |

FOREIGN PATENT DOCUMENTS

| | | | |
|---|---|---|---|
| DE | 10211357 A1 | 9/2002 | |
| DE | 102010003694 A1 * | 10/2011 | ................ B60P 3/40 |
| EP | 1387802 A1 | 2/2004 | |
| EP | 2333315 A2 | 6/2011 | |
| WO | 2005/005286 A1 | 1/2005 | |
| WO | 2010/135737 A1 | 11/2010 | |
| WO | 2011/098086 A1 | 8/2011 | |

OTHER PUBLICATIONS

Search Report issued in International Application No. PCT/EP2013/072386 dated Jan. 23, 2014 (dated Jan. 23, 2014).

Wodumedia: Image of wind turbine blade transport in China, Sep. 2010. Available from http://wodumedia.com/making-a-windfarm/windturbine-blades-ready-to-be-transported-from-a-factory-in-chinasnorthern-hubei-province-september-2010/ [accessed Mar. 5, 2013].

* cited by examiner

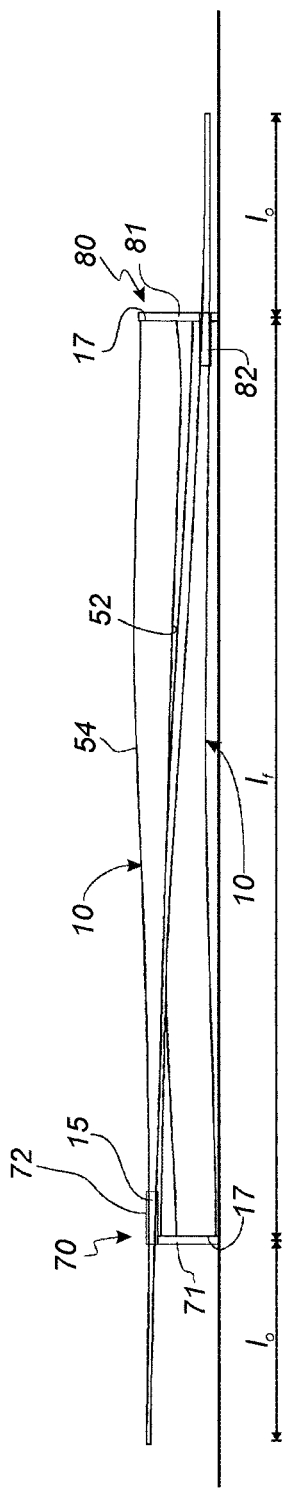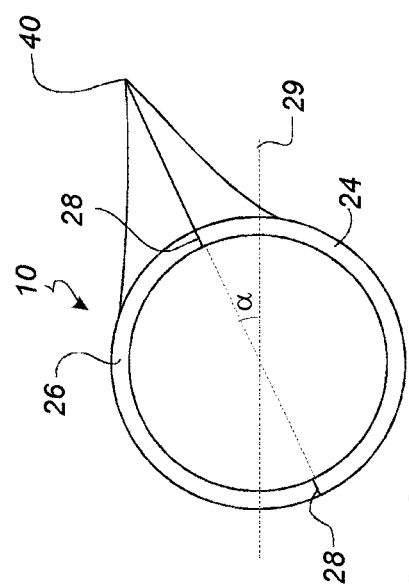

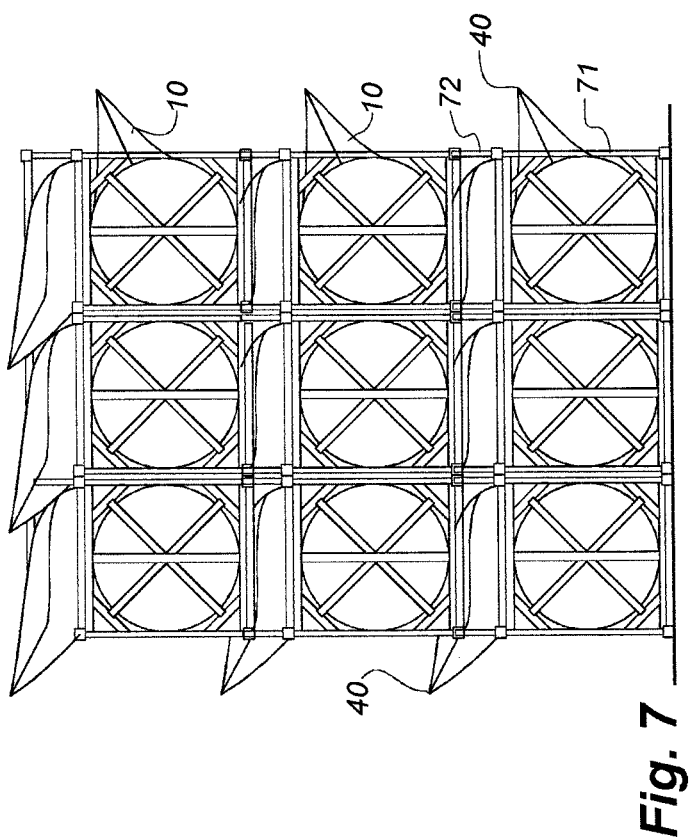
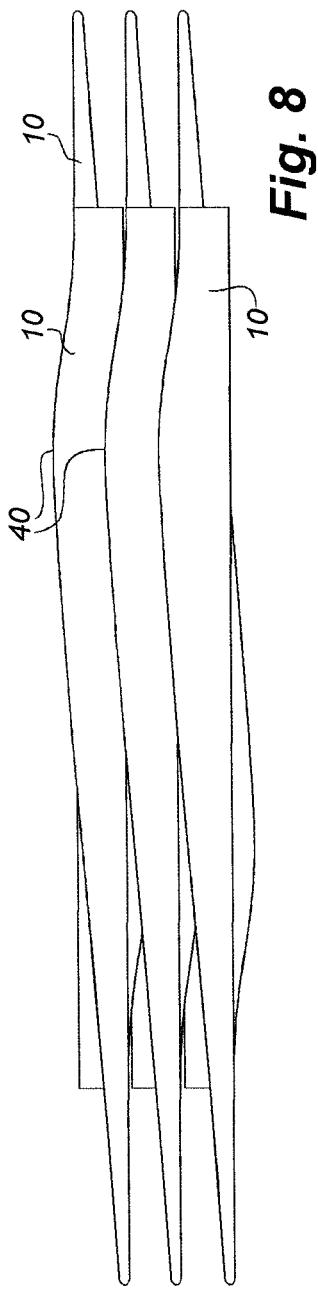

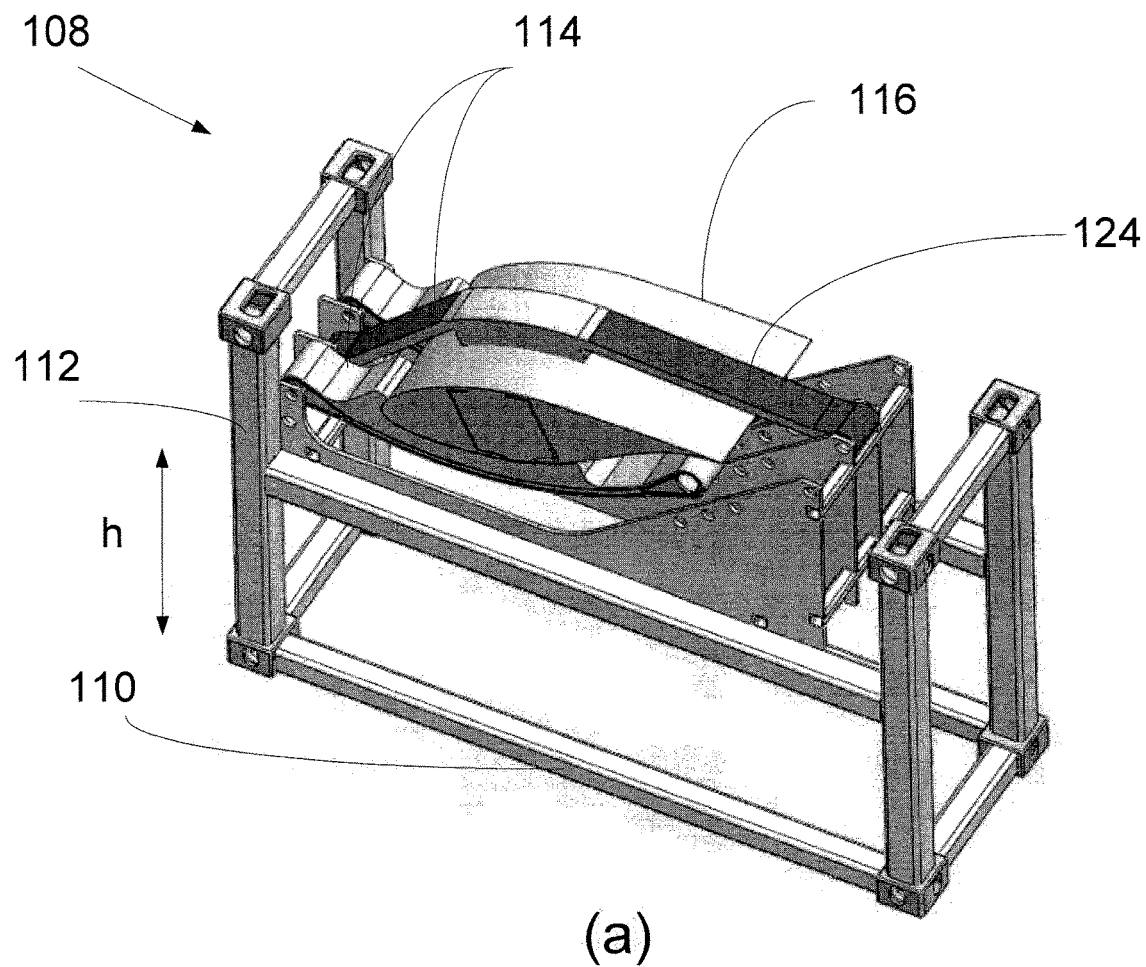
(a)
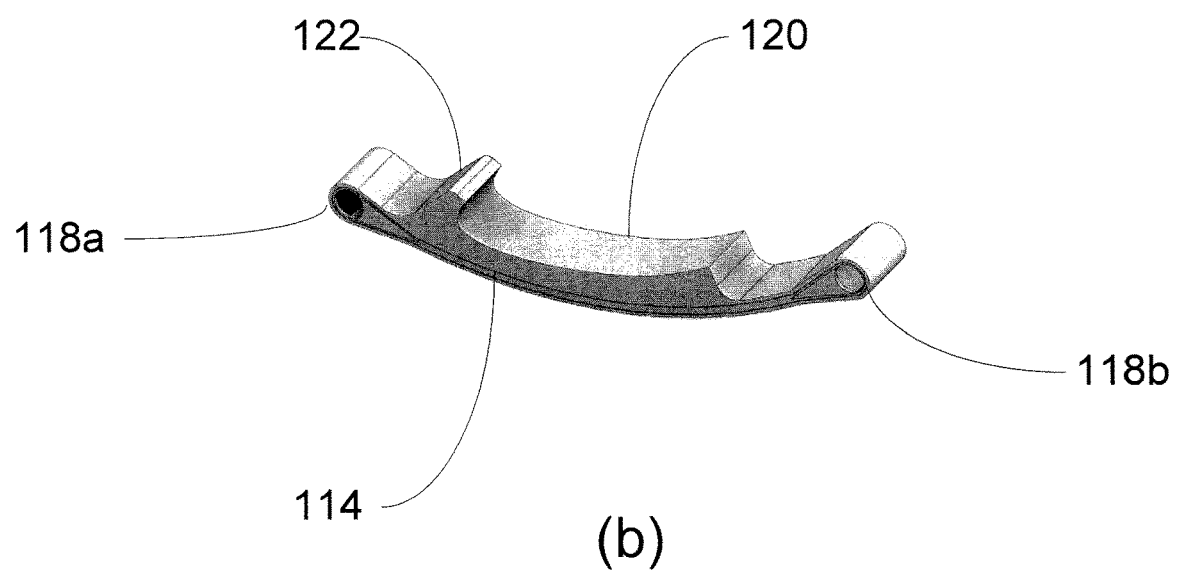
(b)
Fig. 12

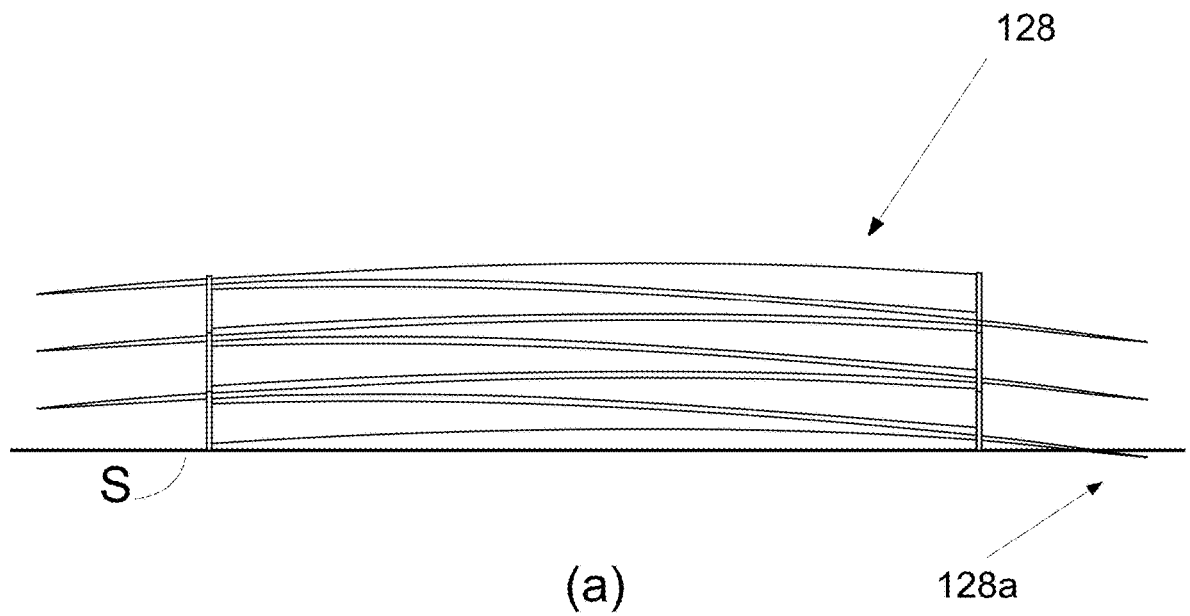
(a)
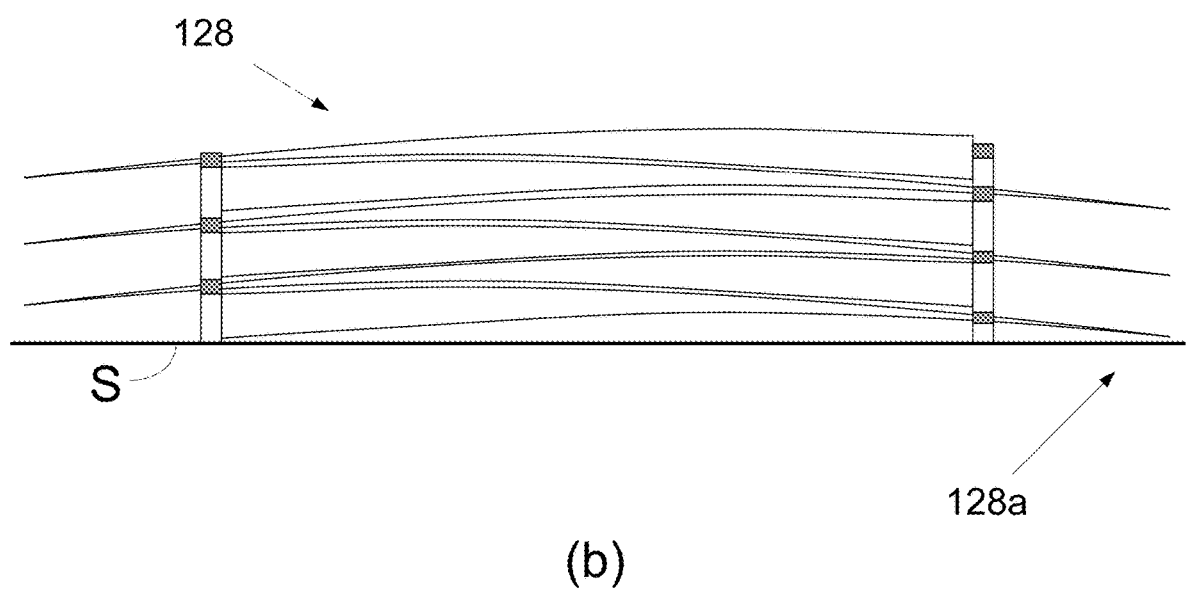
(b)
Fig. 13

METHOD AND SYSTEM FOR TRANSPORTING AND STORING AT LEAST TWO WIND TURBINE BLADES

This is an Application filed under 35 U.S.C. 111 as a continuation application of U.S. patent application Ser. No. 14/437,649 filed on Apr. 22, 2015, a national stage application claiming benefit to PCT/EP2013/072386 filed on Oct. 25, 2013, an application claiming benefit to British application Nos. 1219279.5 filed on Oct. 26, 2012 and 1220100.0 filed on Nov. 8, 2012; the content of each is hereby incorporated by reference in its entirety.

FIELD OF THE INVENTION

The present invention relates to a method of transporting or storing of wind turbine blades as well as a transportation and storing system for transporting at least two wind turbine blades including a first wind turbine blade and a second wind turbine blade.

BACKGROUND OF THE INVENTION

Wind turbine blades used for horizontal axis wind turbines for generating electrical power from the wind can be rather large and may today exceed 70 metres in length and 4 metres in width. The blades are typically made from a fibre-reinforced polymer material and comprising an upwind shell part and a downwind shell part. Due to the size and fragility of these large rotor blades, the blades may be damaged during transport as well as during loading and unloading. Such damages may seriously degrade the performance of the blades. Therefore, the blades need to be carefully packaged in order to ensure that they are not damaged.

However, due to the increasing length of modern wind turbine blades, it is gradually becoming more complicated and expensive to transport the blades. It is not uncommon that the transportation costs amount to 20 percent of the total costs for manufacturing, transporting and mounting the wind turbine blade on the rotor of a wind turbine blade. Also, some blades are transported to the erection site through different modes of transport, such as by truck, train and ship. Some of these modes of transports may have restrictions on large loads, maximum heights, maximum widths, maximum distances between transport frames or supports, for instance dictated by local regulations. Therefore, there exists a logistic problem of providing transport solutions that are suitable for various types of transport.

Overall, there is a demand for making transport solutions simpler, safer and cheaper. The prior art shows various solutions for transporting more than one rotor blade using a single container or other packaging system, which is an obvious way to reduce the transport costs. However, the afore-mentioned restrictions and limits may increase the difficulty of transporting a plurality of blades using the same packaging system.

EP1387802 discloses a method and system for transporting two straight wind turbine blades, where the root end of a first blade is arranged in a first package frame, and the tip end of a second, neighbouring blade is arranged in a second package frame that is arranged next to and connected to the first package frame with the effect that the blades are stored compactly alongside each other in a "tip-to-root" arrangement. However, in this transport system the tip end frames support the blades at the very tip of the blades, where they are mechanically most fragile. Further, the package frames are arranged at the root end face and the blade tip. Therefore, the distance between the package frames are approximately equal to the length of the blades. For very long blades of 45 metres or longer, this might not be possible due to local regulations and restrictions on transport.

It is therefore an object of the invention to obtain a new method and system for storing and transporting a plurality of wind turbine blades, which overcome or ameliorate at least one of the disadvantages of the prior art or which provide a useful alternative.

SUMMARY OF THE INVENTION

Accordingly, there is provided a transport system for a wind turbine blade having a root end transport frame and a tip end transport frame, the frames being stackable, wherein the frames are arranged such that a root end transport frame and at least a portion of a successively-stacked tip end transport frame will overlap with the root end diameter of a wind turbine blade supported by the said root end transport frame, and wherein the tip end transport frame is arranged such that a tip end of a supported pre-bent or swept blade will be spaced from the ground.

According to an aspect of the invention, there is provided a method for transporting or storing at least two wind turbine blades and comprising a first wind turbine blade and a second wind turbine blade, the wind turbine blades each having a root end and a tip end, wherein the method comprises the steps of: a) placing the first wind turbine blade so that the tip end of the first wind turbine blade points in a first direction, b) placing the second wind turbine blade adjacent and in immediate vicinity to the first wind turbine blade so that the tip end of the second wind turbine blade points in a second direction, which is substantially opposite to the first direction. According to the first aspect, the second wind turbine blade is in step b) arranged so that the tip end of the second wind turbine blade extends beyond the root end of the first wind turbine blade. The tip end of the first wind turbine blade may also extend beyond the root end of the second wind turbine blade. This will inevitably be the case, if the first wind turbine blade and the second wind turbine blade are of the same length.

Thus, it is clear that the two wind turbine blades are arranged substantially parallel to each other and oriented in opposite directions. Since the thickness of the blades is typically decreasing from the root end towards the tip end, the blades can with the new "tip-to-root" layout be arranged on top of each other via frames having a relatively small combined cross-section. Further, the new setup ensures that a tip end section of the second wind turbine blade may be supported farther from the tip end than with a common frame assembly for supporting the root of the first wind turbine blade and a tip section of the second blade. Thereby, the tip end section may be supported at a position where the blade is mechanically stronger than right at the tip end.

Additionally, the new transport layout ensures that the frame assemblies may be arranged longitudinally closer to each other, thereby being able to abide to local regulations that may put restrictions on the maximum distance between support frames for transport.

According to an advantageous embodiment, the first wind turbine blade and the second wind turbine blade in steps a) and b) are stacked on top of each other, i.e. so that the second wind turbine blade is arranged above the first wind turbine blade. Advantageously, the first wind turbine blade and the second wind turbine blade are arranged so that chordal planes of their respective tip ends are arranged substantially horizontally. By "substantially horizontally" is meant that the chordal plane may vary up to +/−25 degrees to horizontal.

In a preferred embodiment, the blades are arranged so that an upwind side (or pressure side) of the blade is facing substantially downwards.

According to an alternative embodiment, the first wind turbine blade and the second wind turbine blade in steps a) and b) are stacked side-by-side. In such an embodiment, the first wind turbine blade and the second wind turbine blade may advantageously be arranged so that chordal planes of their respective tip ends are arranged substantially vertically. Thus, the blades may for instance be arranged so that they are supported at their leading edges (which are mechanically stronger than the trailing edges) via an upwardly facing receptacle.

In a stacking system for storing more than two blades, it is also possible to stack the blades both horizontally and vertically, i.e. in a stacked array.

The method advantageously relates to transport and storage of blades having a blade length of at least 40 metres, or at least 45 metres, or even at least 50 metres. The blades may be prebent so that, when mounted on an upwind configured horizontal wind turbine in a non-loaded state, they will curve forward out of the rotor plane so that the tip to tower clearance is increased.

The first and the second wind turbine blades may be prebent. Such prebent blades may be arranged in the tip end frames and root end frames so that they are straightened slightly or fully during transport, e.g. as shown in WO05005286 by the present applicant. However, the blades need not forcedly be straightened. Since the blades are supported near the ends and the blades are arranged with the upwind side facing downwards, the own weight of the blade may straighten the blades due to the gravitational forces acting on the middle part of the blade.

According to a preferred embodiment, the root end of the first wind turbine blade is arranged in a first root end frame, the root end of the second wind turbine blade is arranged in a second root end frame, the tip end of the first wind turbine blade is arranged in a first tip end frame, and the tip end of the second wind turbine blade is arranged in a second tip end frame. The tip end frames preferably comprise a receptacle for supporting a tip end section. Thus, the first tip end frame comprises a first tip end receptacle, and the second tip end frame comprises a second tip end receptacle. Depending on the particular solution, the receptacle may for instance either support the pressure side of the blade or alternatively the leading edge of the blade. However, in principle the receptacle may also support the suction side of the blade or even the trailing edge of the blade. The frames themselves may be used as lifting tools so that two or more blades may be lifted in one go and without imposing stress to the blades.

In a particularly advantageous embodiment, the second tip end frame is connected, optionally detachably connected, to the first root end frame, and the first tip end frame is connected, optionally detachably connected, to the second root end frame. Thus, it is clear that the frames may be constructed as an integral solution comprising both a root end frame and a tip end frame (or receptacle), or as separate frames for the root and the tip. The latter solution has the advantage, that the second blade may more easily be disengaged from the first blade, simply by detaching the tip end frames from the root end frames.

In another embodiment, the connection parts of the root end frames and the tip end frames that connect to or fix the blade in the frame may be hinged to the frame itself. This can for instance for the root be achieved by connecting a plate to the root of the blade that is hingedly connected to the frame. Similarly, this can be achieved by letting a tip end receptacle be hingedly connected to the tip end frame. Such embodiments have the advantage of alleviating loads that would otherwise be introduced to either the frames or blades due to blade deflections or the like during transport.

In another advantageous embodiment, the first root end frame and/or the second root end frame is a root end bracket adapted to be attached to a root end face of a wind turbine blade. This provides a particularly simple solution, where the frame or bracket may be attached to for instance a root end plate of the blade and without having to support the exterior of the blade. Thus, external damages to the outer surface of the blades may more easily be avoided. The tip end frames (with receptacles) may be attached to the brackets, so that the tip end extends beyond the bracket, when the blade is inserted into the tip end frame (and receptacle).

In yet another advantageous embodiment, the first root end frame and the second tip end frame are connected in a L-shaped or T-shaped configuration so that a base of the L- or T-shaped configuration is attached to the root end of the first wind turbine blade, and a transversely extending frame part (or extremity) of the L- or T-shaped configuration supports a longitudinal section of the tip end of the second wind turbine blade. The same of course also applies to the second root end frame and the first tip end frame. Advantageously, the L- or T-shaped configuration is formed so that the base is a root end face bracket attached to the root end face of the first blade, and the transversely extending frame part supports a tip end section of the second blade.

The frame connection is arranged so that the base of the L- or T-configuration is arranged vertically. The transversely extending frame part may be arranged to that it extends from the top or the bottom of the base. In this configuration the second wind turbine blade is arranged on top of the first wind turbine blade. The extremity or transversely extending frame part may thus support either a part of the suction side or the pressure side of the blade in an upwardly facing receptacle. Alternatively, the extremity may extend from the side of the base. In such a configuration, the blades are arranged side-by-side, and the extremity or transversely extending frame part may support either a part of the leading edge or the trailing edge of the blade in an upwardly facing receptacle.

If the blades are arranged so that both blades are facing with the leading edge downwards (in the side-by-side arrangement) or with the upwind shell parts facing downwards (in the vertically stacked arrangement), it is clear that the transversely extending frame parts of the two frame assemblies must be arranged inversely compared to the base frame. Thus, the two frame assemblies have slightly different configurations.

The L- or T-shaped frame assembly has the advantage that the transversely extending frame supports a larger part of the tip sections, thus better alleviating loads and possibly also minimising the necessary overhang of the tip part that extends beyond the root end frame.

In one embodiment, the longitudinal extent of the transversely extending frame part is at least 1 meter, advantageously at least 1.5 metres, more advantageously at least 2 metres. The longitudinal section of the tip end of the blade may be supported along the entire section, or it may be supported in a plurality of discrete sections within the extremity of the L- or T-shaped frame assembly.

As an alternative to the L- or T-shaped frame assembly, the root end frame and the tip end frame may be arranged substantially in the same plane.

Advantageously, a plurality of first wind turbine blades and second wind turbine blades are placed in an array, and wherein the wind turbine blades each comprise a shoulder defining a maximum chord of the blade, and wherein the blades are arranged so that the maximum chord forms an angle of between 20 and 75 degrees to a horizontal plane, advantageously between 22 and 73 degrees. Even more advantageously, the maximum chord forms an angle of between 15 and 35 degrees to a horizontal plane, advantageously between 20 and 30 degrees. It is clear that this stacking method may be advantageous to any configuration of stacking blades side by side with the root end and tip end arranged in the same direction. In a preferred embodiment, it is the root end of the blade that is turned between 15 and 35 degrees to a horizontal plane, advantageously between 20 and 30 degrees. The angle may for instance be defined by bond lines between an upwind shell part and a downwind shell part at the root end of the blade. In this setup, the blades in a stacked array may be arranged so that they slightly overlap with the shoulder of one blade extending partly over an adjacent blade, so that the upwind side of one blade near the shoulder faces down towards the downwind side near the leading edge of an adjacent blade. Thereby, it is possible to stack the blades in frames having a width corresponding to the diameter of the root or only slightly larger, even though the chord length of the shoulder exceeds this diameter.

In another embodiment, intermediate protection members are arranged between the first wind turbine blade and the second wind turbine blade. The intermediate protection members are preferably arranged at a longitudinal position between the first root end frame and the second root end frame. Advantageously, the intermediate protection members are arranged near the tip end frames so as to provide additional support to a tip end section of the wind turbine blade. The protection means prevent the blades from being damaged due to bending or the blades impacting each other. The intermediate protection members are particularly advantageous, when the blades are stacked on top of each other. In such a setup, the intermediate protection members may be used as support for supporting an additional tip end section of one blade and may transfer loads from the tip end of the upper blade to the mechanically stronger root region of the lower blade. Additional protection members may be arranged below the lowermost blade in a stacked array and a support platform or the ground. The additional protection member is advantageously arranged to support an additional tip end section of the lowermost blade, e.g. near the tip end frame of the lowermost blade.

The intermediate protection members may be made of a foamed polymer.

In another embodiment, a root end face of the first wind turbine blade is arranged within 45 metres of a root end face of the second wind turbine blade, advantageously within 42 metres. Accordingly, root end brackets or frames should also be arranged at maximum 45 metres or 42 metres from each other.

According to the first aspect, the invention also provides a transportation and storage system for at least two wind turbine blades and comprising a first wind turbine blade and a second wind turbine blade. The wind turbine blades each have a root end and a tip end. The system comprises a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction. The tip end of the second wind turbine blade extends beyond the root end of the first wind turbine blade, and the tip end of the first wind turbine blade extends beyond the root end of the second wind turbine blade, when the first and the second wind turbine blades are arranged in the packaging system. Thus, again it is clear that the system is adapted to arranging the first and the second wind turbine blades substantially parallel to each other and pointing tip to root but with an overhang.

According to a first embodiment, the packaging system comprises: a first root end frame for attachment to the root end of the first wind turbine blade, a first tip end frame for supporting a tip end portion of the first wind turbine blade, a second root end frame for attachment to the root end of the second wind turbine blade, and a second tip end frame for supporting a tip end portion of the second wind turbine blade. The second tip end frame may be connected, optionally detachably connected, to the first root end frame, and the first tip end frame may be connected, optionally detachably connected, to the second root end frame. Thus, it is clear that the frames may be constructed as an integral solution comprising both a root end frame and a tip end frame (or receptacle), or as separate frames for the root and the tip. The latter solution has the advantage, that the second blade may more easily be disengaged from the first blade, simply by detaching the tip end frames from the root end frames.

In one advantageous embodiment, the first root end frame and/or the second root end frame are root end brackets adapted to be attached to a root end face of the first wind turbine blade and the second wind turbine blade, respectively. This provides a particularly simple solution, where the frame or bracket may be attached to for instance a root end plate of the blade and without having to support the exterior of the blade. Thus, external damages to the outer surface may more easily be avoided. The tip end frames (with receptacles) may be attached to the brackets, so that the tip end extends beyond the bracket, when the blade is inserted into the tip end frame (and receptacle).

In the tip end of the first wind turbine blade, when arranged in the first tip end frame, extends a first longitudinal extent beyond the first tip end frame, and the tip end of the second wind turbine blade, when arranged in the second tip end frame, extends a second longitudinal extent beyond the first tip end frame. In other words, the first tip end frame is adapted to package the tip end of first wind blade at a first distance from the tip, and the second tip end frame is adapted to package the tip end of the tip end of the second wind turbine blade at a first distance from the tip. The first distance and the second distance will of course typically be approximately the same. The first longitudinal extent and the second longitudinal extent may be at least 2 metres, advantageously at least 3.5 metres, and more advantageously, at least 5 metres. The blade tip may even extend at least 6, 7, or 8 metres beyond the tip end frame.

In a particular advantageous embodiment, the storage system is adapted to stack the first and the second wind turbine blade on top of each other. The second tip end frame may for instance be attached to a top of the first root end frame, and the first tip end frame is attached to a bottom of the second root end frame. In this setup the blades are arranged so that chord planes of the tip ends of the blades are arranged substantially horizontally. The setup may be adapted to arrange the blades with an upwind shell part substantially downwards.

In an alternative embodiment, the tip end frames are attached to sides of the root end frames. In such a setup the chord planes of tip end of the blades are arranged substantially vertically, advantageously with a leading edge facing downwards.

In another embodiment, at least a first intermediate protective member is arranged between the first wind turbine blade and the second wind turbine blade. The first intermediate protective member may advantageously be arranged near the tip end of an upper arranged blade of the first wind turbine blade and the second wind turbine blade. Additionally, a second protective member may be arranged below the lower of the two wind turbine blades. In a stacked array, this blade will then also be an intermediate protective member arranged between two blades. Further, a protective member may be arranged below the lowermost blade in the stacked array. The intermediate protective members may be made of a foamed polymer.

It is clear that some of the provided solution may also be used for other configurations of transporting and storing blades, e.g. without the tip overhang.

Thus, according to a second aspect, the invention provides a method for transporting or storing at least two wind turbine blades and comprising a first wind turbine blade and a second wind turbine blade, the wind turbine blades each having a root end and a tip end, wherein the method comprises the steps of:
a) placing the root end of the first wind turbine blade in a first root end frame,
b) placing a tip end section of the first wind turbine blade in a first tip end frame,
c) placing the root end of the second wind turbine blade in a second root end frame, so that the second root end frame is arranged near the first tip end frame with the first tip end frame substantially above the second root end frame,
d) placing a tip end section of the second wind turbine blade in a second tip end frame, so that the second tip end frame is arranged near the first root end frame with the second tip end frame substantially below the first root end frame, wherein the method comprises the additional step of arranging an intermediate protection means between the first wind turbine blade and the second wind turbine blade.

According to another aspect, the invention also provides a transportation and storage system for at least two wind turbine blades and comprising a first wind turbine blade and a second wind turbine blade, the wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction, wherein the transportation and storage system includes a packaging system that comprises:
a first root end frame for attachment to the root end of the first wind turbine blade,
a first tip end frame for supporting a tip end portion of the first wind turbine blade,
a second root end frame for attachment to the root end of the second wind turbine blade, and
a second tip end frame for supporting a tip end portion of the second wind turbine blade, wherein the packaging system further comprises an intermediate protection means arranged between the first wind turbine blade and the second wind turbine blade.

According to a further aspect, the invention provides a method for transporting or storing at least two wind turbine blades and comprising a first wind turbine blade and a second wind turbine blade, the wind turbine blades each having a root end and a tip end, wherein the method comprises the steps of:
a) placing the root end of the first wind turbine blade in a first root end frame,
b) placing a tip end section of the first wind turbine blade in a first tip end frame,
c) placing the root end of the second wind turbine blade in a second root end frame,
d) placing a tip end section of the second wind turbine blade in a second tip end frame, wherein
the first root end frame and the second tip end frame as well as the first tip end frame and the second root end frame are connected as L-shaped or T-shaped frame assemblies so that bases of the frame assemblies are attached to the root ends of the first and the second wind turbine blade, and extremities of the frame assemblies support a longitudinal section of the tip ends of the first and the second wind turbine blades.

The invention also provides a transportation and storage system for at least two wind turbine blades and comprising a first wind turbine blade and a second wind turbine blade, the wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction, wherein the transportation and storage system includes a packaging system that comprises:
a first root end frame for attachment to the root end of the first wind turbine blade,
a first tip end frame for supporting a tip end portion of the first wind turbine blade,
a second root end frame for attachment to the root end of the second wind turbine blade, and
a second tip end frame for supporting a tip end portion of the second wind turbine blade, wherein
the first root end frame and the second tip end frame as well as the first tip end frame and the second root end frame are connected as L-shaped or T-shaped frame assemblies so that bases of the frame assemblies are attached to the root ends of the first and the second wind turbine blades, and extremities of the frame assemblies support a longitudinal section of the tip ends of the first and the second wind turbine blades.

Further, the invention provides a frame assembly for use in transport and storing of wind turbine blades, wherein the frame assembly comprises a root end frame part for attachment to a root end of a first wind turbine blade and a tip end frame part for supporting a tip end section of a second blade, wherein the root end frame part and the tip end frame part are attached in an L-shaped or T-shaped configuration.

According to a further aspect, the invention provides a transportation and storage system for at least two wind turbine blades and comprising a first wind turbine blade and a second wind turbine blade, the wind turbine blades each having a root end and a tip end as well as a shoulder defining a maximum chord of the blade, wherein the method comprises the steps of:
a) placing the root end of the first wind turbine blade in a first root end frame, b) placing a tip end section of the first wind turbine blade in a first tip end frame,
c) placing the root end of the second wind turbine blade in a second root end frame,
d) placing the tip end section of the second wind turbine blade in a second tip end frame,
e) arranging the first and the second blade parallel to each other so that the first root end frame is placed adjacent the second root end frame, and the first tip end frame is arranged adjacent the second tip end frame, wherein
the first wind turbine blade and the second wind turbine blade are arranged so that the maximum chord of the blades form angles of between 15 and 35 degrees to a horizontal plane, advantageously between 20 and 30 degrees, more advantageously around 25 degrees.

It is clear that all the embodiments described with respect to a first aspect of the invention also apply to any other aspect of the invention.

In particular, there is provided a transport system for a wind turbine blade having a tip end and a root end, the blade further having a bolt circle diameter D at said root end, wherein the transport system comprises:
a root end transport frame for supporting a root end of a wind turbine blade;
a tip end transport frame for supporting a portion of a wind turbine blade towards the tip end of said blade, said tip end transport frame comprising a base frame and a support bracket provided on top of said base frame for receiving a portion of a wind turbine blade;
wherein said tip end transport frame is stackable on top of said root end transport frame, such that the transport system is operable to stack successive wind turbine blades in an alternating root end to tip end arrangement;
wherein said root end transport frame has a height H;
wherein said tip end transport frame comprises a base frame having a height h; and
wherein (H+h) is approximately equal to D;
such that a root end transport frame and the base frame of a successively stacked tip end transport frame overlap with a root end of a wind turbine blade supported by said root end transport frame.

Providing tip end supports having a base height of h means that when an individual wind turbine blade is supported on a surface using the transport system, the tip end of such a blade is spaced from the underlying surface via said base height. Furthermore, when in a stacked configuration, as the construction of the root end frame allows the tip end frame to overlap with the root end of a wind turbine blade stacked beneath the tip end frame, the height of a stacked collection of wind turbine blades using said transport system will be reduced.

By overlap, it will be understood that, by providing the tip end frame with a base height h on top of which the support bracket is located, this allows the base frame to be stacked on top of a preceding root end frame, such that the vertical height of the root end frame and the base frame of the tip end frame are substantially equal to the root end diameter of the supported blade.

Preferably, (0.5 D)<H<(0.9 D).

There is also provided a root end transport frame for a wind turbine blade, the blade having a tip end and a root end, the transport frame having a height, a width, and a depth,
wherein the height of the transport frame is less than the bolt circle diameter of a root end of a wind turbine blade to be supported by said transport frame.

A reduced-height transport frame allows for relatively easier handling of the transport frame, and reduces transport and handling costs of the frame when not in use supporting a wind turbine blade.

Preferably, the width of said transport frame is equal to or greater than the bolt circle diameter of a wind turbine blade to be supported by said transport frame.

Preferably, the depth of said transport frame is equal to or greater than one quarter of the width of the transport frame.

Providing a transport frame with such dimensions results in a stable structure with a low centre of mass, and which is able to support a wind turbine blade.

Preferably, the root end transport frame comprises:
a frame body;
a root end plate coupled to said frame body, said root end plate arranged to couple with a root end of a wind turbine blade,
wherein said root end plate is arranged to couple with less than ⅔ of the bolt circle of a root end of a wind turbine blade to support said wind turbine blade on said transport frame.

As the root end plate is designed to support a wind turbine blade by only coupling with a portion of the root end of the wind turbine blade, accordingly the height of the root end plate relative to the bolt circle diameter of the root end of the wind turbine blade may be reduced, resulting in a reduced total height of the root end transport frame.

Preferably, said root end plate comprises a substantially C-shaped body arranged to couple with a portion of the bolt circle of a root end of a wind turbine blade.

There is also provided a root end transport frame for a wind turbine blade, the blade having a tip end and a root end, the transport frame comprising:
a frame body; and
a root end plate for coupling to the root end of a wind turbine blade, wherein said root end plate is hingedly coupled to said frame body.

By providing a hinged root plate, any bending moments due to blade deflection or bending are prevented from being transferred to the frame body. Accordingly, the frame body may be of a relatively lighter construction, as it does not need to bear such relatively large forces.

Preferably, said root plate is hingedly coupled to said frame body along the horizontal axis.

As the angle to the vertical made by the root end of a blade may depend on factors such as the centre of gravity of the blade and the blade bending properties, accordingly the ability for the root plate to hinge along the horizontal axis allows for different angles of the blade root end to be accommodated by the transport frame.

Additionally or alternatively, said root plate is hingedly coupled to said frame body along the vertical axis.

The hinging of the root plate around the vertical prevents damage to the transport frame due to misalignment or handling issues.

Preferably, said root end plate is mounted on at least one bracket arm, said at least one arm coupled to said transport frame via a hinged joint.

Preferably, said at least one bracket arm comprises an articulated bracket.

The use of an articulated bracket allows for greater degrees of freedom of manipulation of the root plate, to more easily receive and accommodate the root end of a wind turbine blade on the transport frame.

Preferably, said transport frame comprises at least a first and a second bracket arm, wherein said first and second bracket arms are positioned on opposed sides of a notional central longitudinal axis of a wind turbine blade to be mounted to said root end plate.

By positioning the bracket arms on either side of the centre point of the blade root end, the take up of forces from the root end of the blade is balanced in the transport frame.

There is also provided a tip end transport frame for a wind turbine blade, the blade having a tip end and a root end, the transport frame comprising:
 a frame body;
 a tip end support bracket for supporting a portion of a wind turbine blade towards the tip end of said blade, wherein a first end of said tip end support bracket is hingedly coupled to said transport frame along the horizontal axis; and
 wherein a leading edge support lip is provided on said bracket, said leading edge support lip arranged to receive a portion of the leading edge of a wind turbine blade supported by said support bracket, such that the wind turbine blade can be pivotably moved about said hinged coupling relative to said transport frame while supported on said bracket.

By providing a hinged coupling for the support bracket, a wind turbine blade may be adjusted relative to the frame body, to allow for correct positioning of the wind turbine in the transport frame. The leading edge support lip provided on the bracket allows for the partial support of the wind turbine blade, preventing unwanted movement of the wind turbine blade during any such pivoting or subsequent transport.

Preferably, a second end of said support bracket may be releasably secured to said frame body when said support bracket is received in said frame body.

Preferably, said tip end support bracket comprises a flexible strap having a support surface provided on said flexible strap.

The use of a flexible strap as part of the bracket allows for minor adjustments or movements of a supported wind turbine blade to be absorbed through appropriate torsion or twisting of the strap, without being transferred to the relatively rigid frame body. Accordingly, the frame body may be of a more lightweight construction compared to prior art systems.

Preferably, the tip end transport frame further comprises a securing strap to be fitted around a wind turbine blade received in said transport frame.

Preferably, the tip end transport frame is arranged to be positioned at a location toward the tip end of a wind turbine blade to be supported by the transport system, such that a sweep or bend of the wind turbine blade from the location of said tip end transport frame to the tip end of the supported blade is less than height h of the base frame of the tip end transport frame.

The transport system is preferably used in the transport of blades having a pre-bend $\Delta y$, and/or swept blades. Accordingly, locating the support bracket of the tip end frame above the horizontal surface by a height h allows for such a curved blade to be supported on the ground without the tip end of the blade striking the ground.

Preferably, the tip end transport frame is arranged to be positioned spaced from the tip end of the blade.

Preferably, a wind turbine blade to be supported by the transport system has a longitudinal length L, wherein the tip end transport frame is arranged to be positioned at a distance F from the root end of said blade, wherein $(0.5\,L)<F<(0.95\,L)$, preferably $(0.6\,L)<F<(0.85\,L)$.

Supporting the tip portion of the wind turbine blade at such a location in the outboard portion of the blade, spaced from the tip end, provides a balance between effectively structurally supporting the blade, while reducing the minimum effective wheelbase or support surface needed to support the total transport system.

There is further provided a method of transporting at least two wind turbine blades having a tip end and a root end, the method comprising the steps of:
 supporting a first wind turbine blade, wherein a first root end transport frame is arranged to support the root end of said first wind turbine blade and a first tip end transport frame is arranged to support a portion of said first wind turbine blade towards the tip end of said first blade, said first wind turbine blade having a bolt circle diameter D at said root end;
 supporting a second wind turbine blade, wherein a second root end transport frame is arranged to support the root end of said second wind turbine blade and a second tip end transport frame is arranged to support a portion of said second wind turbine blade towards the tip end of said second blade, and
 stacking said second root end transport frame on top of said first tip end transport frame, and stacking said second tip end transport frame on top of said first root end transport frame, wherein said second wind turbine blade is stacked in an alternating root end to tip end arrangement above said first wind turbine blade to form a unit for transport,
 wherein at least said first root end transport frame is arranged to have a height H,
 wherein said first and second tip end transport frames are arranged to support the respective first and second wind turbine blades at a height h above the base of the first and second tip end transport frames, and
 wherein (H+h) is approximately equal to D,
 such that said first root end transport frame and at least a portion of said second tip end transport frame overlap with the root end of said first wind turbine blade.

It will be understood that any of the above-described features may be combined in any embodiment of the transport system as described. Further, it will be understood that said tip end transport frame may be provided separately to said root end transport frame, and vice versa.

DETAILED DESCRIPTION OF THE INVENTION

Figure 2:
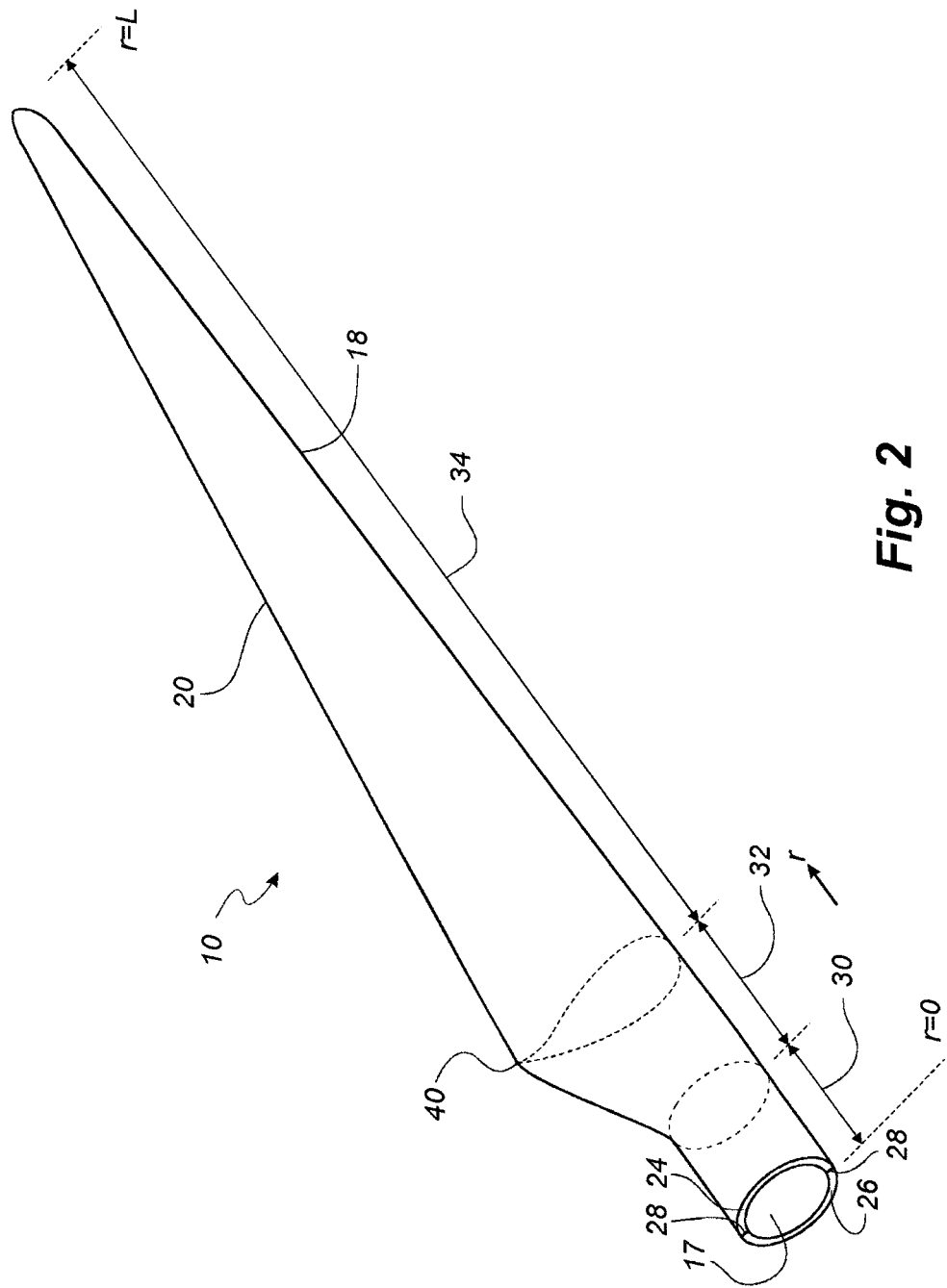
Figure 3:
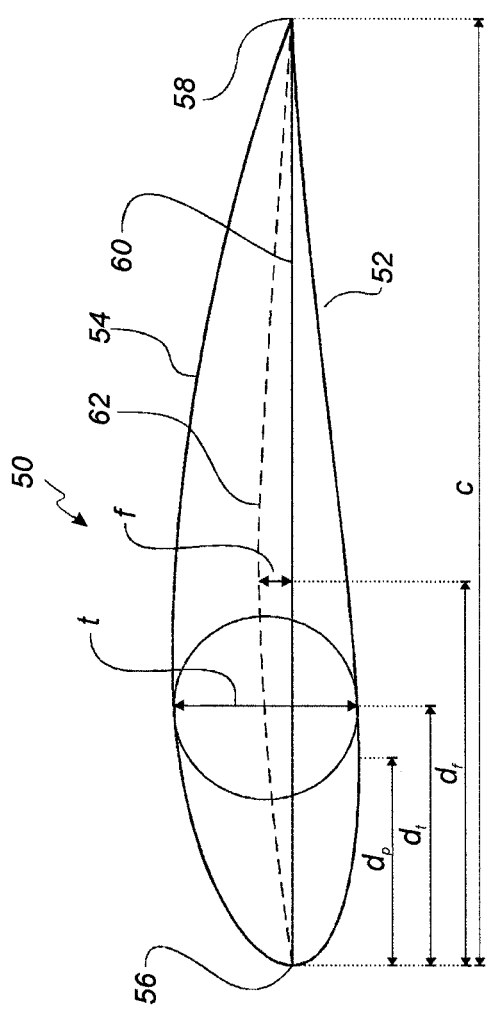
Figure 4:
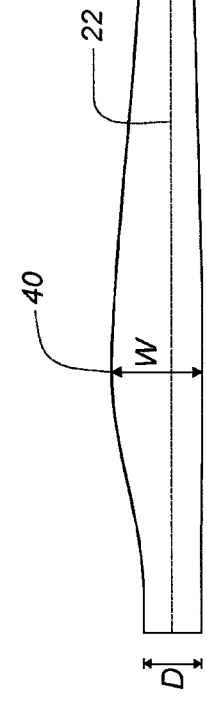
Figure 9:
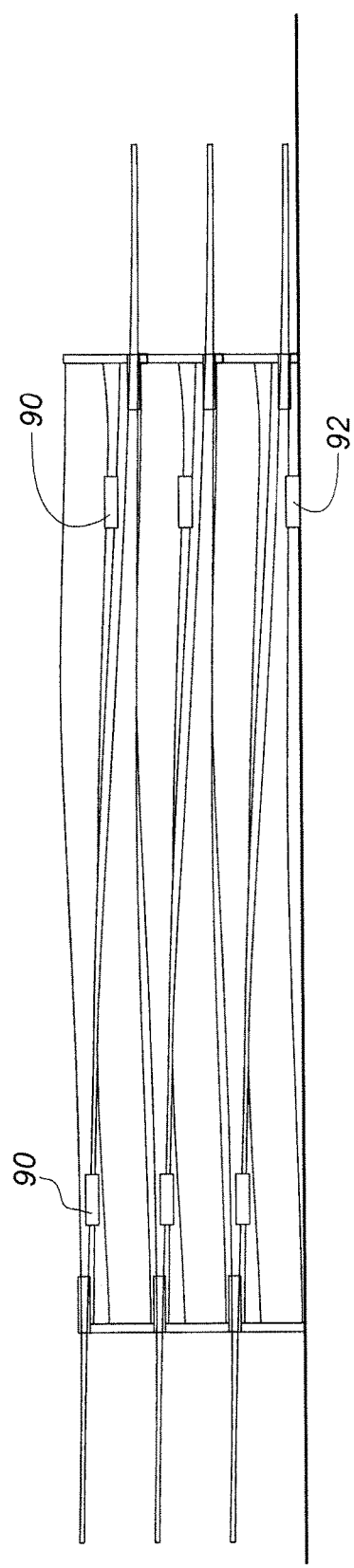
Figure 10:
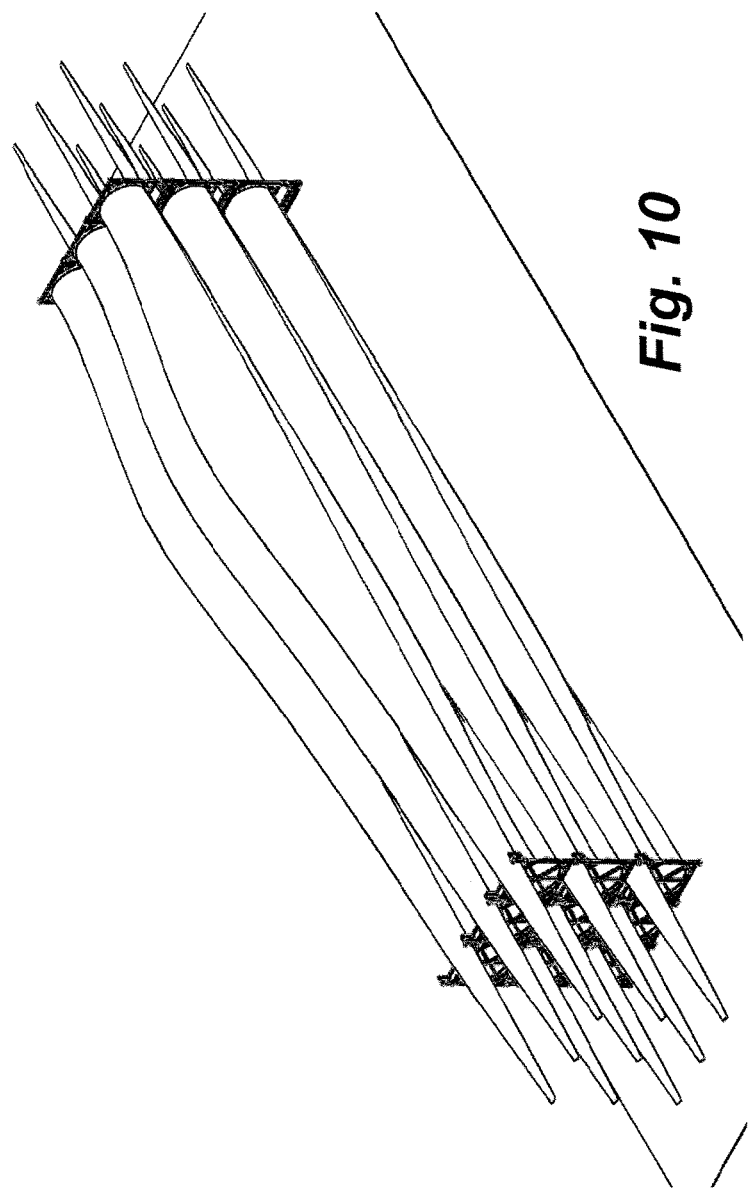
Figure 11:
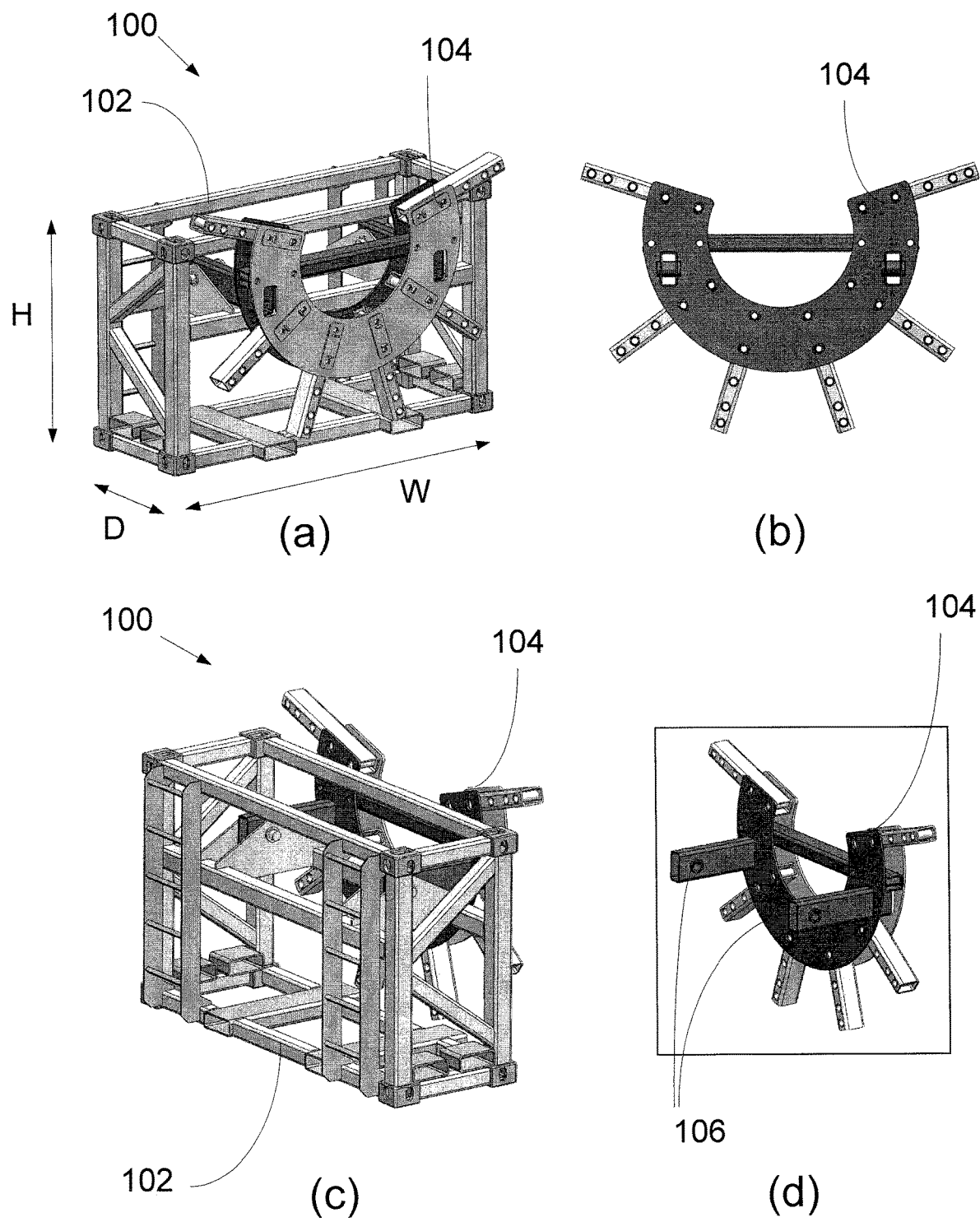

The invention is explained in detail below with reference to embodiments shown in the drawings, in which
 FIG. 1 shows a wind turbine,
 FIG. 2 shows a schematic view of a wind turbine blade according to the invention,
 FIG. 3 shows a schematic view of an airfoil profile,
 FIG. 4 shows a schematic view of the wind turbine blade according to an embodiment of the invention, seen from above and from the side,
 FIG. 5 shows a schematic side view of a first wind turbine blade and a second wind turbine blade stored in a packaging system according to the an embodiment of invention,
 FIG. 6 illustrates how the blades are oriented in the packaging system according to an embodiment of the invention,
 FIG. 7 shows a schematic end view of blades stored in a stacked array of packaging systems according to an embodiment of the invention,
 FIG. 8 shows a top view of the mutual arrangement of blades when stacked in an array, FIG. 9 shows a schematic side view of a number of first wind turbine blades and second wind turbine blades stored in a packaging system according to an embodiment of the invention with intermediate protection means arranged between the blades, FIG. 10 shows a perspective view of blades stored in a stacked array of packaging systems in an alternative embodiment of the invention, FIG. 11 shows an embodiment of a root end transport frame according to an embodiment of the invention, FIG. 12 shows an embodiment of a tip end transport frame according to an embodiment of the invention, and FIGS. 13(a) and 13(b) shows a side view of an arrangement of pre-bent wind turbine blades supported by transport systems according to embodiments of the invention.

The present invention relates to transport and storage of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell made of fibre-reinforced polymer and is typically made as a pressure side or upwind shell part 24 and a suction side or downwind shell part 26 that are glued together along bond lines 28 extending along the trailing edge 20 and the leading edge 18 of the blade 10.

FIGS. 3 and 4 depict parameters, which are used to explain the geometry of the wind turbine blades to be stored and transported according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as X. Further, the blade is provided with a prebend, which is defined as Δy, which corresponds to the out of plane deflection from a pitch axis 22 of the blade.

Blades have over the time become longer and longer and may now exceed a length of 70 metres. The length of the blades as well as the shape of the blades with respect to shoulder, twist and prebending makes it increasingly difficult to transport the blades, in particular if a plurality of blades is to be transported and stored together. The shape and size of the blades also puts limitations on how closely the blades can be stored in a stacked array.

FIG. 5 shows a schematic view of first embodiment of a transportation and storage system according to the invention for transporting and storing a first wind turbine blade and a second wind turbine blade 10. The transportation and storage system includes a packaging system that comprises a first frame assembly 70. The first frame assembly 70 is composed of a root end frame 71 in form of a root end bracket for attachment to a root end face 17 of the first wind turbine blade, and a tip end frame 72 for supporting a tip end section 15 of the second wind turbine blade. The first frame assembly has an L-shaped configuration, where the root end bracket 71 forms the base of the L-shaped assembly, and the tip end frame 72 forms a transversely extending frame part (or extremity) that extends from the top of root end bracket 71. The second frame assembly 80 is also composed of a root end frame 81 in form of a root end bracket for attachment to a root end face 17 of the second wind turbine blade, and a tip end frame 82 for supporting a tip end section 15 of the first wind turbine blade. The first frame assembly has an L-shaped configuration, where the root end bracket 81 forms the base of the L-shaped assembly, and the tip end frame 82 forms a transversely extending frame part (or extremity) that extends from the bottom of root end bracket 81.

In terms of the following claims, it is clear that the first frame assembly comprises the first root end frame and the second tip end frame, whereas the second frame assembly comprises the second root end frame and the first tip end frame.

Some local regulations have limitations on the maximum distance $l_f$ between supports for transporting items, for instance a maximum of 42 metres. The packaging system accommodates for such regulations by being designed so that the tip ends of the first wind turbine blade and the second wind turbine blade extend beyond the root end frames 70, 80 so that a longitudinal extent $l_o$ or overhang of the tip ends extends beyond the root end frames 70, 80, thereby being able to transport blades of lengths exceeding the maximum distance $l_f$ between supports. Further, this novel setup has the advantage that the tip end sections are supported at a distance from the respective tip ends, where the blades are mechanically stronger than right at the tip. Thus, the probability of the frames damaging the blades is lowered significantly. Further, the L-shaped configuration of the frame assemblies 70, 80 is adapted to support the tip ends over a longitudinal extent of e.g. at least 1 metre, thereby ensuring an even better support for the blades.

The tip end frames 72, 82 may advantageously comprise one or more receptacles having an upwardly facing support face for supporting a part of the upwind side of the blade. Further, the tip end frames 72, 82 may advantageously be detachably coupled to the root end frames 71, 81.

In the shown setup, the blades are arranged with the pressure side (or upwind side) facing substantially downwards. Thereby, the blades are also arranged so that the middle part of the blade is spaced further from the support surface or ground due to the prebending of the blades. However, the blades are as shown in FIG. 6 turned so that the bond lines 28 as well as the chord of the shoulder 40 forms an angle α of approximately 25 degrees to a horizontal line 29. This has a further advantage, when blades are stacked in arrays comprising first and second frame assemblies 70, 80 and accordingly comprising an array of stored first and second wind turbine blades, since the blades may be stacked more compactly than conventional systems for transporting and storing such blades. This is better illustrated in FIGS. 7 and 8 that show blades stacked in an array, where FIG. 7 shows an end view of the transportation and storage system with the blades stored in the system, and FIG. 8 shows a top view of the blades in the array with the storage system removed from the figure in order to better illustrate the mutual arrangement of the blades.

From the end view shown in FIG. 7, it is seen that the first blades that have their root end faces attached to the root end brackets 71 are arranged so that the shoulders of the blades 40 point slightly upwards and to the right, whereas the second blades that have their tip end sections supported in the tip end frames 72 are arranged so that the shoulders 40 point upwards and towards the left side of the figure. Thereby, the blades can be stacked side by side in frames that are only slightly wider than the root diameter D of the blades.

In the top view shown in FIG. 8, it is seen that the blades are arranged so that they slightly overlap with the shoulder 40 of one blade extending partly over an adjacent blade, so that the upwind side of one blade near the shoulder faces down towards the downwind side near the leading edge of an adjacent blade.

In some situations it may be advantageous to provide additional support members for taking up loads from the blades, for instance by providing intermediate support members 90 between the first and the second wind turbine blades. The intermediate support members 90 may advantageously be arranged near the tip end of the upper blade so that loads may be transferred from a tip section of the upper blade to a root section of a lower blade. An additional protection member 92 may be arranged between the lowermost blade in an array and the support platform or ground. The protection members 90, 92 may for instance be made of a foamed polymer.

With reference to FIG. 11, an embodiment of a root end transport frame according to an aspect of the invention is indicated generally at 100. The root end transport frame 100 comprises a frame body 102 and a root end plate 104 coupled to the frame body 102. FIG. 11(*a*) illustrates a front perspective view of the transport frame 100, FIG. 11(*b*) illustrates a plan view of a root end plate 104 of the transport frame, FIG. 11(*c*) illustrates a rear perspective view of the transport frame 100, and FIG. 11(*d*) illustrates a rear perspective view of the root end plate of the frame of FIG. 11(*c*).

The transport frame 100 is arranged to couple with less than the entire circumference of a bolt circle of a wind turbine blade to be supported by the transport frame, as this provides several advantages in terms of stability, and transport and handling issues.

The transport frame 100 is designed to have a height H less that the bolt circle diameter of the root end of a wind turbine blade to be supported by the transport frame, and preferably to have a width W greater than or equal to said bolt circle diameter. The depth $D_f$ of the frame 100 is designed to adequately support the frame 100, preferably being at least one quarter of the bolt circle diameter distance. Such a construction provides a relatively low centre of mass of the transport frame 100, and reduced the possibility of the frame 100 being easily overturned, either when supporting a root end of a wind turbine blade or when not supporting a blade.

The root end plate 104 is hingedly coupled to the frame body 102, via a pair of projecting bracket arms 106. In the embodiment of FIG. 11, the bracket arms 106 are hinged to the frame body 102 about the horizontal axis, but it will be understood that any suitable hinged joint may be provided, and/or articulated brackets may be provided. The use of a hinged connection between the root end plate 104 and the frame body 102 means that the plate 104 can be provided at any suitable angle to the vertical, to accommodate any bending or deflection of the root end of the wind turbine blade, without transferring such bending moments to the frame body 102. As a result, the frame body 102 may be of a relatively lightweight construction, as it does not have to bear such relatively large bending moments from the blade root end.

Preferably, at least two bracket arms 106 are provided, with the arms 106 arranged to be spaced around the centre point of the root end of a blade supported by said transport frame 100, such that the forces associated with said wind turbine blade are evenly transferred to the supporting frame body 102.

The root end plate 104 is preferably arranged to couple with a subsection of the bolt circle of a wind turbine blade root end, resulting in a reduced height of the total structure of the transport frame 100. The embodiment of FIG. 11 shows the end plate 104 having a substantially C-shaped structure, wherein the plate 104 is operable to couple with approximately ⅔ of the bolt circle of a wind turbine blade root end. The shape and coupling of the root end plate 104 is selected so as to adequately support a root end of a wind turbine blade, while keeping the height of the transport frame 100 structure to a minimum.

It will be understood that any other suitable shape of root end plate 104 may be used, which is arranged to couple with a portion of a bolt circle of a wind turbine blade, e.g. a U-shaped plate, a substantially square plate, etc.

It will be understood that the root end plate 104 may be provided with a plurality of coupling apertures arranged along separate notional bolt circles on the end plate 104, to accommodate the coupling of the root end plate 104 to root ends of different wind turbine blades having different bolt circle diameters. This allows the root end transport frame 100 to be interchangeably used with wind turbine blades of different dimensions. It will further be understood that the coupling apertures may be shaped to be wider and/or longer than corresponding apertures in the bolt circle of a wind turbine blade, to allow for adjustment of coupling between the root end plate 104 and the blade root end, for example in the event of misalignment, root end ovalisation, etc.

With reference to FIG. 12(a), an embodiment of a tip end transport frame according to an aspect of the invention is indicated generally at 108. The transport frame 108 comprises a base frame 110 and a support portion 112 provided at the top of the base frame 110. The support portion 112 comprises at least one tip end support bracket 114 which is hingedly coupled to the transport frame 108. The support bracket 114 receives a portion of a wind turbine blade (indicated by section 116) to be supported by the tip end transport frame 108, wherein the blade portion is spaced from the tip end of the blade.

With reference to FIG. 12(b), an enlarged view is shown of an example of a tip end support bracket 114. The bracket 114 comprises first and second ends 118a,118b arranged to couple with the support portion 112 of the tip end transport frame 108. The bracket 114 further comprises a cushioning or padding material 120 arranged to support the surface of a wind turbine blade. A leading edge support lip 122 is provided on the bracket 114, preferably projecting from the cushioning or padding material 120. The leading edge support lip 122 is arranged to receive the leading edge of a wind turbine blade supported on the bracket 114, to prevent movement of the blade when on the bracket 114.

In use, a first end 118a of the bracket 114 may be attached to the support portion 112, with the second end 118b projecting free of the frame. A portion 116 of a wind turbine blade can be placed on the bracket 114 with the leading edge of the blade fitted adjacent to said lip 122. The bracket may then be pivoted relative to the transport frame body, to position the blade within the transport frame 108, at which point the second end 118b of the bracket 114 can be secured to the frame 108. A secondary support strap 124 may then be positioned over the surface of the blade section 116 opposed the support bracket 114, and secured to the support portion 112, to securely retain the wind turbine blade within the transport frame 108.

It will be understood that the support bracket 114 may be formed from a relatively flexible strap having a cushioning or padding material 120 and a leading edge support lip 122 moulded onto the strap.

The base frame 110 of the tip end transport frame 108 has a height h. This ensures that the portion 116 of the wind turbine blade is supported at a distance h from the ground or underlying surface. With reference to FIG. 13, this configuration of a transport system for a wind turbine blade provides additional advantages when used for the transportation or storage of pre-bent wind turbine blades, where the wind turbine blades are manufactured to have a curve or bend in a substantially upwind direction, as described in European Patent No. EP1019631.

FIG. 13(a) illustrates a head-to-toe stacking arrangement of pre-bent wind turbine blades 128 using a transport system as shown in FIGS. 5 and 9, provided on a surface S. In this case, the pre-bend of the wind turbine blades 128 will result in the tip end 128a of the bottom wind turbine blade projecting beneath the surface level S for the transport system stack. Accordingly, the transport system stack must be provided on a platform raised in some manner from ground level, to ensure that the tip end 128a of the bottom wind turbine blade is not damaged when arranged in the stack. Such an arrangement can lead to additional complications during handling and transportation of the stack.

By contrast, FIG. 13(b) illustrates a head-to-toe stacking arrangement of pre-bent wind turbine blades 128 using a transport system comprising the root end frame 100 and the tip end frame 108 of FIGS. 11 and 12, provided on a surface S. In this embodiment, as the tip end transport frame 108 supports the wind turbine blade section 116 at the top of the base frame 110, at a distance h from the surface level S, accordingly the tip end 128 of the bottom wind turbine blade is maintained above the surface level S, removing the need for any additional raising of the transport stack above the surface S.

The tip end transport frame is arranged to be positioned at a location towards, but spaced from, the tip end of a wind turbine blade. Preferably, the tip end transport frame is arranged to be positioned at a distance F from the root end of the blade, wherein (0.5 L)<F<(0.95 L), preferably (0.6 L)<F<(0.85 L). Supporting the tip portion of the wind turbine blade at such a location in the outboard portion of the blade, spaced from the tip end, provides a balance between effectively structurally supporting the blade, while reducing the minimum effective wheelbase or support surface needed to support the total transport system.

Furthermore, due to the reduced height of the root end transport frame 100, the base frame 110 of subsequent tip end transport frames 108, which are stacked on preceding root end transport frames 100, effectively overlap with the root end of the wind turbine blade supported on the preceding root end transport frames 100. This arrangement acts to reduce the overall height of the transport stack, while accommodating the adjusted dimensions of the tip end transport frames 108, providing for ease of handling and minimised space requirements for transportation.

Preferably, the combined height H of the root end transport frame 100 and height h of the base frame 110 of the tip end transport frame 108 is approximately equal to the bolt circle diameter distance of a wind turbine blade to be supported by the transport frames 100,108.

The invention has been described with reference to preferred embodiments. However, the scope of the invention is not limited to the illustrated embodiments, and alterations and modifications can be carried out without deviating from the scope of the invention that is defined by the following claims. The packaging system has for instance been described in relation to an L-shaped frame assembly. However, in another advantageous embodiment, the frame assembly may be T-shaped so that the root end bracket is attached to the tip end frame at an intermediate part thereof. Also, the blades may be stacked in a packaging system, where the root end frames and tip end frames are arranged in the same plane as shown in FIG. 10. The transportation and storage system has also been described in a configuration, where the second wind turbine blade is arranged above the first wind turbine blade. However, it is clear that the system could also be arranged in a configuration, where the first and the second wind turbine blades are arranged side-by-side. In such a configuration, the blades would instead be arranged so that the bond lines and chord of the shoulder form an angle of approximately 25 degrees compared to vertical. Further, the receptacles of the tip end frames could instead be adapted to support the leading edge of a tip end section instead.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side shell part/upwind shell part
26 suction side shell part/downwind shell part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
70 first frame assembly
71 root end frame/root end bracket (of first frame assembly)
72 tip end frame/transversely extending frame part (of first frame assembly)
80 first frame assembly
81 root end frame/root end bracket (of first frame assembly)
82 tip end frame/transversely extending frame part (of first frame assembly)
90 intermediate protection member
92 additional protection member
100 root end transport frame
102 frame body
104 root end plate
106 bracket arms
108 tip end transport frame
110 base frame
112 support portion
114 support bracket
116 wind turbine blade portion
118 support bracket end
120 cushioned support material
122 leading edge support lip
124 retaining strap
c chord length
$d_t$ position of maximum thickness
$d_f$ position of maximum camber
$d_p$ position of maximum pressure side camber
f camber
$l_f$ longitudinal distance between root end frames
$l_o$ longitudinal extent of blade tip overhang
L blade length
r local radius, radial distance from blade root
t thickness
D blade root diameter
Δy prebend
H root end transport frame height
W root end transport frame width
$D_f$ root end transport frame depth
h tip end transport frame height

The invention claimed is:

1. A root end transport frame for a transport system for a wind turbine blade having a tip end and a root end, the wind turbine blade further having a bolt circle diameter D at said root end, wherein the root end transport frame is configured to support the root end of the wind turbine blade,
 wherein said root end transport frame has a height H, which is less than the bolt circle diameter D at said root end of the wind turbine blade, and
 wherein the root end transport frame comprises:
  a vertically-extending frame body (102); and
  a root end plate (104) for coupling to the root end of the wind turbine blade,
  wherein the root end plate (104) is hingedly coupled to the vertically-extending frame body (102), wherein the hinged coupling of the root end plate (104) to the vertically-extending frame body (102) prevents bending moments from being transferred to the frame body, the root end plate (104) being angularly adjustable with respect to the vertically-extending frame body (102) and being angularly adjustable from a vertical orientation.

2. The root end transport frame according to claim 1, wherein the root end plate (104) is hingedly coupled to the vertically-extending frame body (102) along a horizontal axis.

3. The root end transport frame according to claim 1, wherein the root end plate (104) is mounted on at least one bracket arm, wherein the at least one bracket arm is coupled to said root end transport frame via a hinged joint.

4. The root end transport frame according to claim 3, wherein said at least one bracket arm comprises an articulated bracket.

5. The root end transport frame according to claim 3, wherein said root end transport frame comprises at least a first and a second bracket arm, wherein said first and second bracket arms are positioned on opposed sides of a notional central longitudinal axis of a wind turbine blade to be mounted to said root end plate (104).

6. The root end transport frame according to claim 1, wherein (0.5 D)<H<(0.9 D).

7. The root end transport frame according to claim 1, wherein the root end transport frame has a height, a width, and a depth, wherein the width of said root end transport frame is equal to or greater than the bolt circle diameter of the wind turbine blade to be supported by said root end transport frame.

8. The root end transport frame according to claim 1, wherein the root end transport frame has a height, a width, and a depth, wherein the depth of said root end transport frame is equal to or greater than one quarter of the width of the root end transport frame.

9. The root end transport frame according to claim 1, wherein said root end plate is arranged to couple with less than ⅔ of the bolt circle of the root end of the wind turbine blade to support said wind turbine blade on said root end transport frame.

10. The root end transport frame of claim 9, wherein said root end plate comprises a substantially C-shaped body arranged to couple with a portion of the bolt circle of the root end of the wind turbine blade.

11. The root end transport frame according to claim 1, wherein the root end plate (104) is provided with a plurality of coupling apertures arranged along separate notional bolt circles on the end plate (104) to accommodate the coupling of the root end plate (104) to root ends of different wind turbine blades having different bolt circle diameters.

12. The root end transport frame according claim 1, wherein the root end frame is configured to be vertically stackable with a tip end transport frame of the transport system, such that the transport system is operable to vertically stack successive wind turbine blades in an alternating root end to tip end arrangement.

13. The root end transport frame according to claim 6, wherein (0.5 D)<H<(0.75 D).

* * * * *